US008893655B2

(12) United States Patent
Moore, Jr.

(10) Patent No.: US 8,893,655 B2
(45) Date of Patent: Nov. 25, 2014

(54) GAME FEEDER APPARATUS AND RELATED METHODS

(76) Inventor: John Wesley Moore, Jr., Dayton, TX (US)

(*) Notice: Subject to any disclaimer, the term of this patent is extended or adjusted under 35 U.S.C. 154(b) by 0 days.

(21) Appl. No.: 13/449,288

(22) Filed: May 8, 2012

(65) Prior Publication Data
US 2013/0269621 A1 Oct. 17, 2013

Related U.S. Application Data

(63) Continuation-in-part of application No. 29/418,531, filed on Apr. 17, 2012, now Pat. No. Des. 679,454.

(51) Int. Cl.
*A01K 5/00* (2006.01)
(52) U.S. Cl.
USPC .................. 119/57.91; 119/51.01; 119/61.2
(58) Field of Classification Search
USPC ............. 119/51.01, 57.91, 61.2, 61.56, 61.57
See application file for complete search history.

(56) References Cited

U.S. PATENT DOCUMENTS

| 3,521,860 A * | 7/1970 | Zehrung, Jr. et al. ......... 254/8 R |
| 3,866,759 A * | 2/1975 | Lucas .......................... 212/261 |
| 7,530,340 B1 * | 5/2009 | Jellinek et al. ............ 123/179.25 |
| 2008/0173244 A1 * | 7/2008 | Welker et al. ............... 119/51.01 |
| 2011/0139077 A1 * | 6/2011 | Gray et al. .................. 119/51.11 |
| 2012/0085289 A1 * | 4/2012 | Quiring et al. .............. 119/57.91 |
| 2012/0097109 A1 * | 4/2012 | Sturgeon ..................... 119/51.01 |
| 2012/0211456 A1 * | 8/2012 | Wang ............................. 212/180 |

* cited by examiner

*Primary Examiner* — Kimberly Berona
*Assistant Examiner* — Michael Wang
(74) *Attorney, Agent, or Firm* — John K. Buche; Scott Compton; Buche & Associates, P.C.

(57) ABSTRACT

Disclosed is a game feeder that may be operated by weak or weakened operators for low costs. In one embodiment, the disclosed game feeder comprises: a base with stabilizing legs; a yoke with uprights and a back support extending upwardly from the base; a lifting arm pivotally positioned above the yoke so that said arm extends forward and rearward; an operating jack extending upwardly from the base and connected to the rear end of the lifting arm for pivoting the lifting arm on the yoke; and a barrel with a distributor which are positioned at the front end of the lifting arm. Practically, an operator of the game feeder may suitably lower the barrel, provide feed to a receptacle of the barrel, raise the barrel, and activate the distributor to spread the feed to the ground area near the game feeder.

18 Claims, 6 Drawing Sheets

GAME FEEDER APPARATUS AND RELATED METHODS

CROSS-REFERENCE TO RELATED APPLICATIONS

This application is a continuation-in-part of U.S. patent application Ser. No. 29/418,531 (filed Apr. 17, 2012) Des. 679,454 which is now pending and entitled "GAME FEEDER". Said document is incorporated by reference herein in its entirety.

STATEMENT REGARDING FEDERALLY SPONSORED RESEARCH OR DEVELOPMENT

Not applicable.

BACKGROUND OF THE INVENTION

1. Field of Invention

This specification discloses subject matter in the field of apparatus and related methods for feeding game.

2. Background

Under ordinary circumstances, wildlife naturally obtains food and water from the environment. Occasionally, people bait wildlife to a particular location by providing food and water at said location. For example, the manager of a hunting lease property may bait wildlife to said property to be hunted. For another example, wildlife enthusiasts may bait wildlife to a particular location for observational purposes. Accordingly, there is a need for apparatus and related methods of feeding or watering wildlife.

One type of known apparatus for feeding wildlife is a tripod game feeder. Said type of game feeder generally comprises: a large barrel of feed positioned atop a high tripod; a distributor that is positioned underneath the barrel; and, wherein the feed is top loaded into the barrel and funneled from the bottom of the barrel to the distributor for spreading the feed over the ground in the area underneath the barrel and around the tripod. Although capable of providing food to wildlife, said type of game feeder has not been entirely satisfactory for every circumstance wherein game feeders might be employed. For instance, feed frequently comes in heavy packaging so that top loading of the barrel with feed becomes laborious. As a result, elderly or other feeder operators which are weakened by medical conditions are incapable of loading the feeder. Thus, a need still remains for game feeders that may be operated by weak or weakened operators.

Other types of known game feeders employ blower or auger systems for providing feed to a distributor for spreading the feed over the ground. Such feeders can be operated by weak or weakened operators, but are too expensive to be practical for most game feeding applications. Thus a need remains feeders that may be operated by weak or weakened operators at low cost.

SUMMARY OF THE INVENTION

In view of the forgoing it is an objective of this application to disclose a game feeder that may be operated by weak or weakened operators for low costs. In one embodiment, the disclosed game feeder comprises: a base with stabilizing legs which extending forwardly and laterally therefrom; a yoke with uprights and a back support extending upwardly from the base; a lifting arm pivotally positioned above the yoke so that said arm extends forwardly from the base between the stabilizing legs; an operating jack extending upwardly from the base and connected to one end of the lifting arm; and a barrel with distributor at the other end of the lifting arm. Operably, the game feeder may be operated by: (1) positioning the operating jack in an upward position so that the lifting arm pivots the barrel to a downward position; (2) loading the barrel with feed; (3) positioning the operating jack in a downward position so that the lifting arm pivots the barrel to an upward position; and, (4) operating the distributor to spread the feed over the ground in the area underneath the barrel.

BRIEF DESCRIPTION OF THE FIGURES

Other objectives of the disclosure will become apparent to those skilled in the art once the invention has been shown and described. The manner in which these objectives and other desirable characteristics can be obtained is explained in the following description and attached figures in which.

Figure 1:
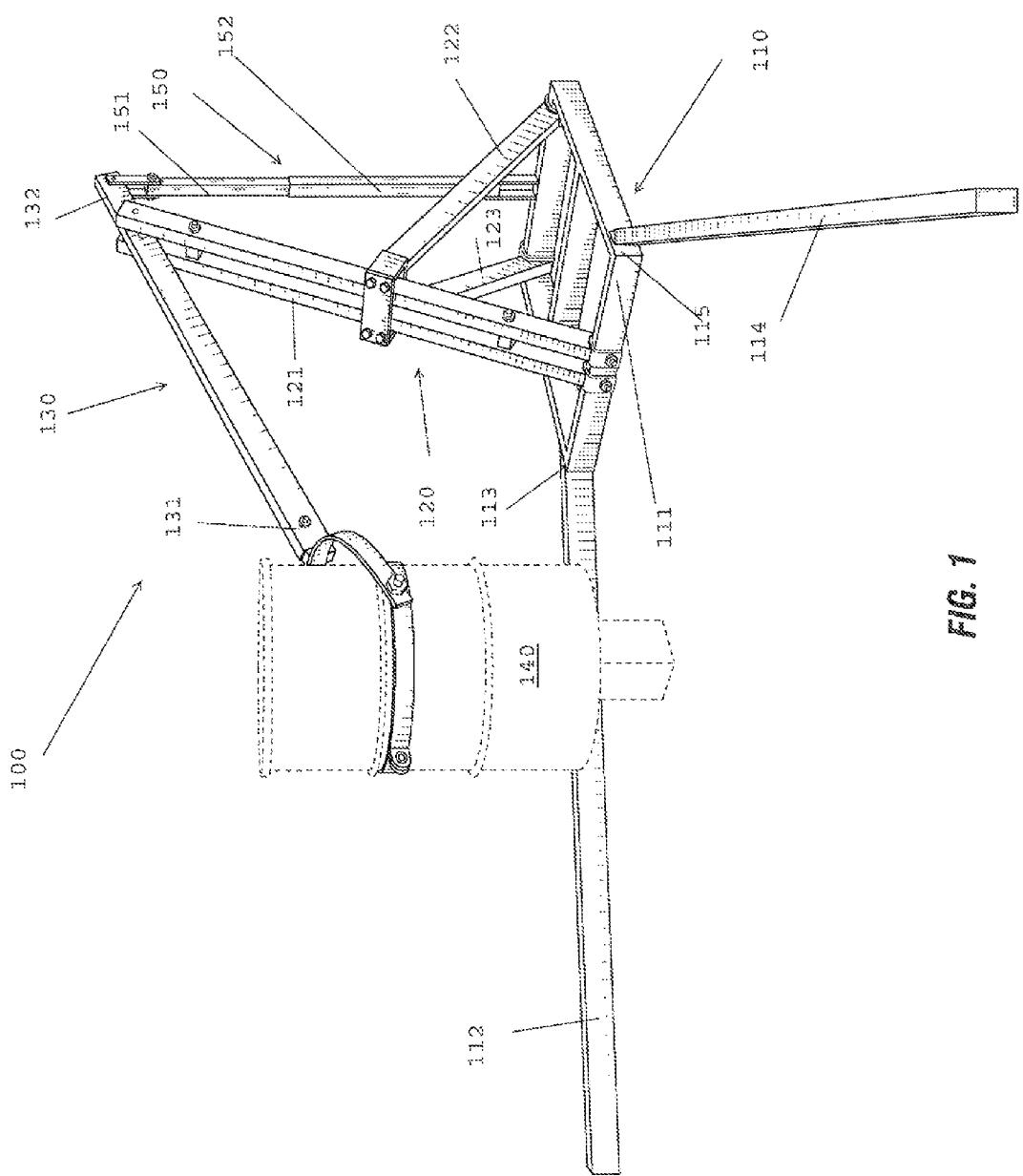
FIG. 1 is a perspective view of a game feeder.
Figure 2:
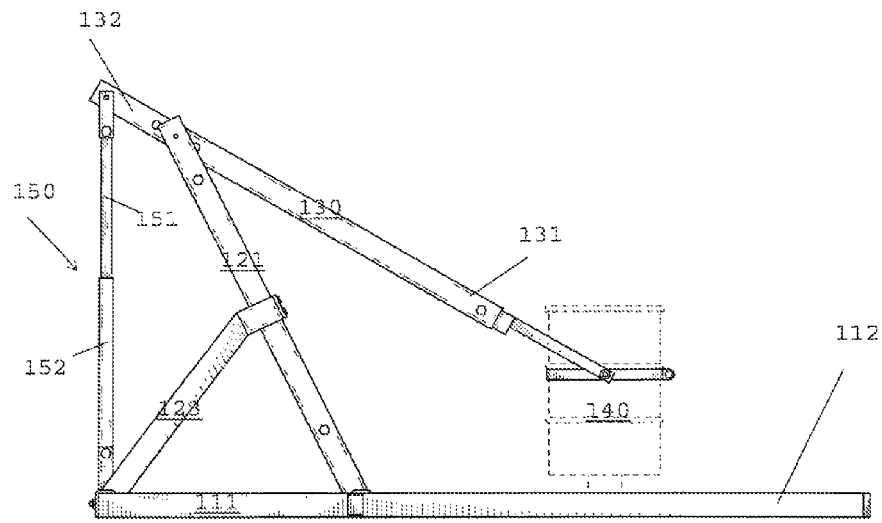
FIG. 2 is a front view of the game feeder of FIG. 1.
Figure 3:
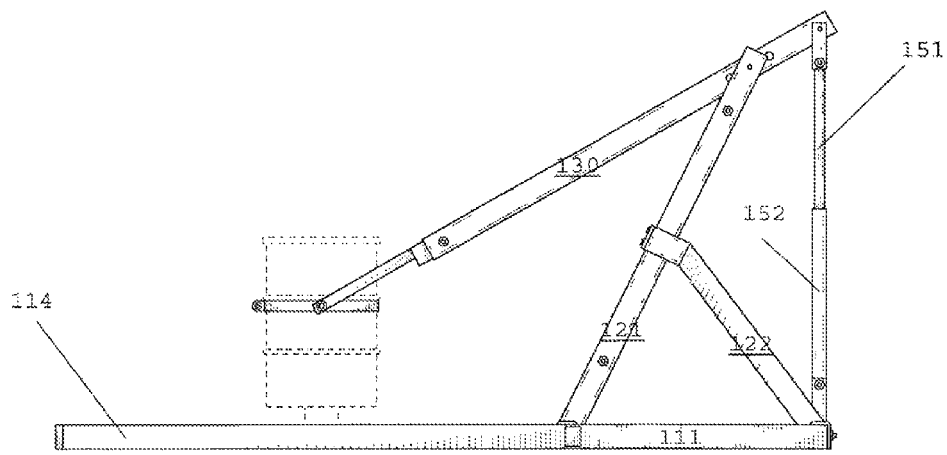
FIG. 3 is a rear view of the game feeder of FIG. 1.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PROFFERED EMBODIMENTS

Generally, the disclosed game feeder features a barrel at the end of a lifting arm, wherein the barrel may be raised or lowered by pivoting the lifting arm on a yoke. The more particular characteristics of the disclosed game feeder are disclosed in connection with FIGS. 1 through 8.

FIGS. 1 through 8 are respectively perspective, front, rear, left side, right side; top, bottom, and environmental views of a preferable embodiment a game feeder 100. As shown in said figures, the game feeder 100 generally comprises: a base 110; a yoke 120 that may be uprightly positioned on the base 110; a lifting arm 130 pivotally positioned on the yoke; a barrel 140 at one end of the lifting arm 130; and, a jack 150 connected between the base 110 and another end of the lifting arm 130. The specific details of each of the disclosed components of the game feeder 100 will be discussed below.

Figure 6:
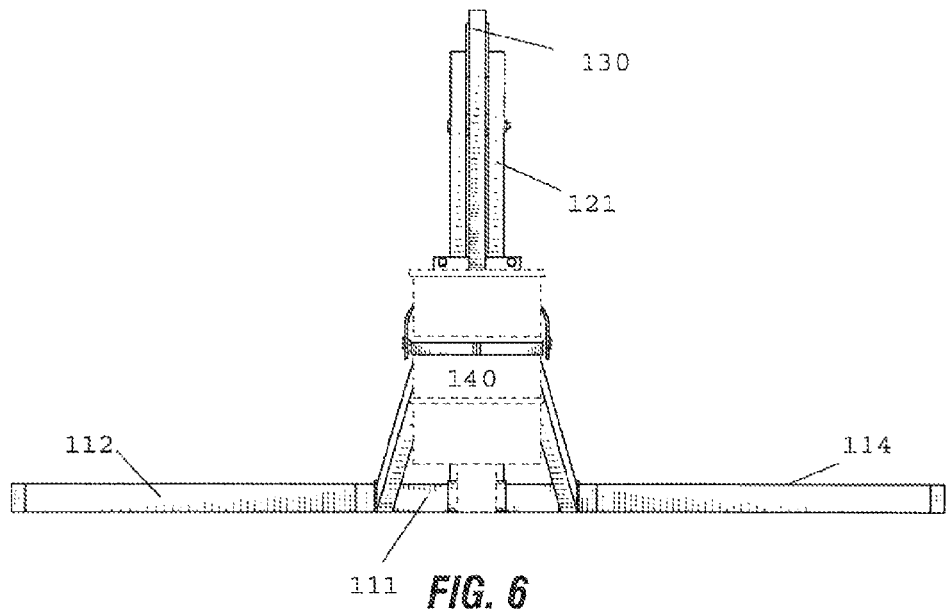
FIG. 6 is top view of the game feeder of FIG. 1.
Figure 7:
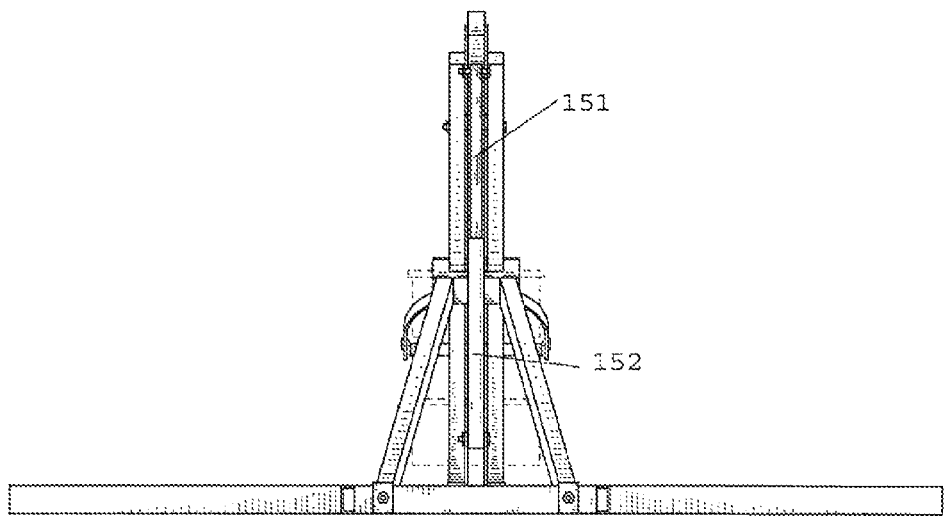
FIG. 7 is a bottom view of the game feeder of FIG. 1; and,
FIG. 8 is an environmental view of the game feeder of FIG. 1.

The base 110 is best seen in FIGS. 1, 6, and 7. Referring to those figures, the base 110 may generally be defined by a rectangular frame 111 with (a) a first stabilizing leg 112 that extends forward and rightward from the right front corner 113 of the frame 111, and (b) a second stabilizing leg 114 that extends forward and leftward from the left front corner 115 of the base 111. Dimensionally, the frame may be a three foot by four foot rectangle and the legs may be eight foot in length. Practically, the base 110 may be employed to stabilize the game feeder 100 during operation thereof.

Figure 4:
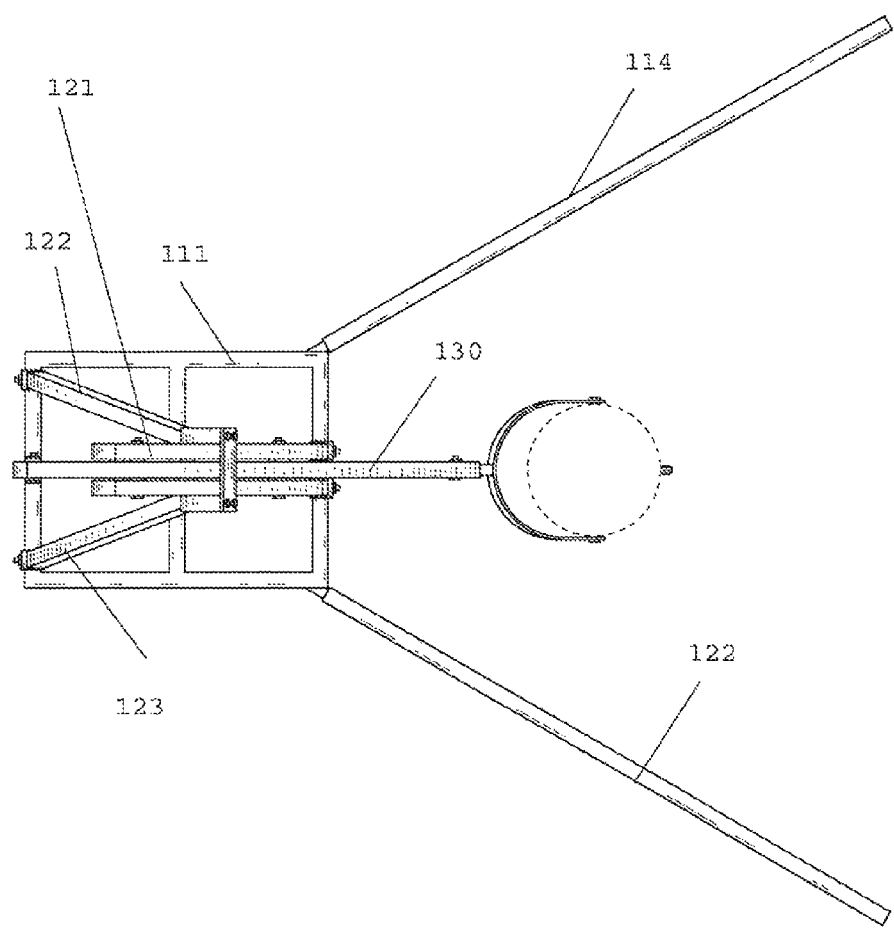
FIG. 4 is a left side view of the game feeder of FIG. 1.
Figure 5:
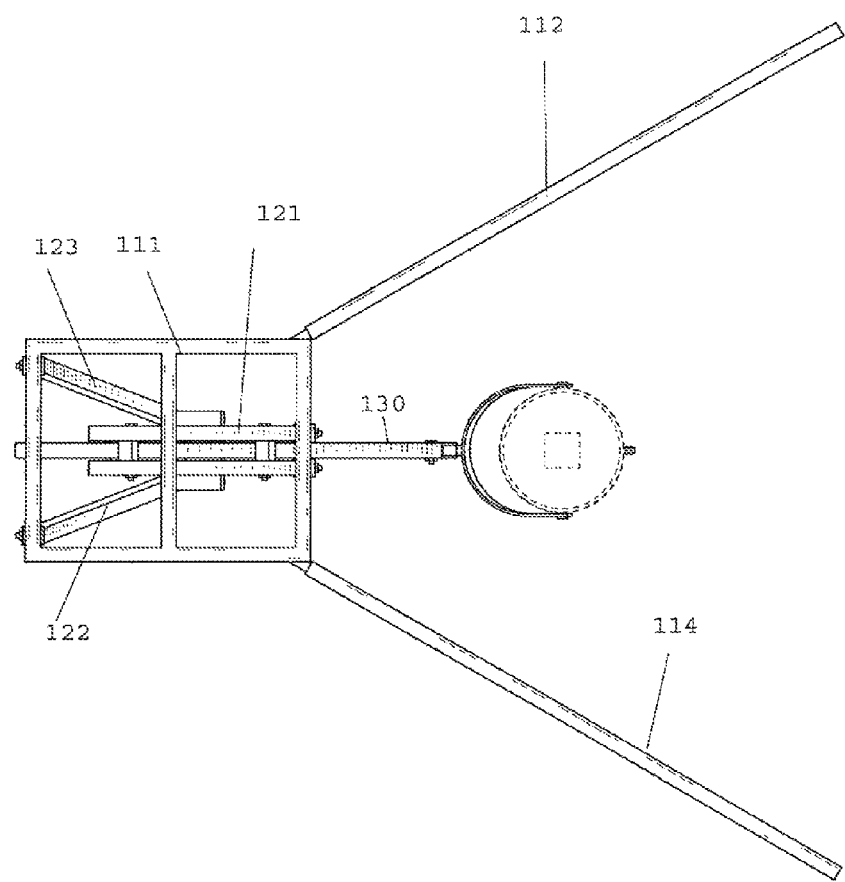
FIG. 5 is a right side view of the game feeder of FIG. 1.

The yoke 120 is best seen in FIGS. 1, 4 and 5. Referring to said figures, the yoke 120 may generally be defined by: backwardly angled uprights 121 secured to the front of the frame 111 of the base 110 between the first and second stabilizing legs 112, 114; a first back support leg 122 extending forwardly and preferably diagonally between the uprights 121 and the rear left corner of the frame 111; and, a second back support leg 123 extending forwardly and diagonally between the uprights 121 and the rear right corner of the frame 111. The yoke 120 may operate as a fulcrum for a lever which has been pivotally attached thereto.

The lifting arm 130 may be best seen in FIGS. 1 and 4 through 8. With reference to those figures, the lifting arm 130 defines a lever that has been pivotally attached to the yoke 120 between the uprights 121 so that: a first end 131 of the lifting arm 130 extends forward; and, a second end 132 of the lifting arm 130 extends rearward. Practically, the lifting arm 130 may be pivoted on the yoke 120 in the manner of a lever and fulcrum respectively.

The barrel 140 may be seen in FIGS. 1, 2, and 4 through 8. As shown the barrel 140 may be defined by a feed receptacle 141 in communication with a distributor for spreading feed. In one embodiment, the barrel 140 may be pivotally positioned at the first end 131 of the lifting arm 130 so that: (a) the lifting arm may be used as a lever to raise or lower the barrel 140; and, (b) the barrel and distributor may remain level while being raised or lowered by operation of the lifting arm 130. Operably, the barrel 140 suitably retains and spreads feed that has been deposited therein.

The operating jack 150 may be seen in FIGS. 1, 3, 6, and 8. As depicted, the operating jack 150 is a screw jack with: an upper piston 151 connected to the second end 132 of the lifting arm 130; a lower piston 152 communicating with the upper piston and attached to the rear of the frame 111 of the base 110; and, an output shaft 153 for effecting extension and retraction of the upper piston 151. Operably, the upper piston 151 may be either (a) extended to push the second end 132 of the lifting arm 130 upward whereby the lifting arm pivots on the yoke 120 to lower the barrel 140 at the first end 131 of the lifting arm 130 lower the bucket; or (b) retracted to pull the second end 132 of the lifting arm 130 downward so that the lifting arm 130 levers on the yoke 120 whereby the barrel 140 is raised at the first end 131 of the lifting arm 130. In one embodiment, the output shaft may be cranked by a cordless electric drill. Dimensionally, the operating jack may be six foot and two inches in height when the upper piston is fully extended. Although depicted as a screw jack, it is contemplated that any type of jack (e.g., a scissor jack, hydraulic jack, pneumatic jack, or the like) may be employed without departing from the modes of operating the game feeder 100.

In one embodiment, the feeder may be assembled by: (1) placing the frame 111 on a support surface (e.g., the ground); (2) coupling the first stabilizing arm 112 to a mounting bracket on the right corner 113 of the frame 111; (3) coupling the second stabilizing are 114 to a mounting bracket on the left corner 115 of the frame 111; (4) coupling the rear left corner of the frame 111 to a mounting bracket at the end of the first support leg 122; (5) coupling the rear right corner of the frame 111 to a mounting bracket at the end of the second support leg 123; (6) coupling the frame 111 to mounting brackets at the ends of the uprights 121; (7) coupling the uprights 121 to mounting brackets on the first and second up support legs 122, 123; (8) pivotally installing the lifting arm 130 in between the uprights 121 of the yoke 120; (9) coupling the operating jack 150 to the frame 111 and second end 132 of the lifting arm 130; and (10) pivotally installing the barrel 130 to the first end 131 of the lifting arm 130. The feeder may be constructed of wood (e.g., pine or oak), metals (e.g., steal or aluminum), plastics (e.g., polyvinyl chloride) and the like and said couplings of component parts may be done in any manner known to those skilled in the art.

Figure 8:
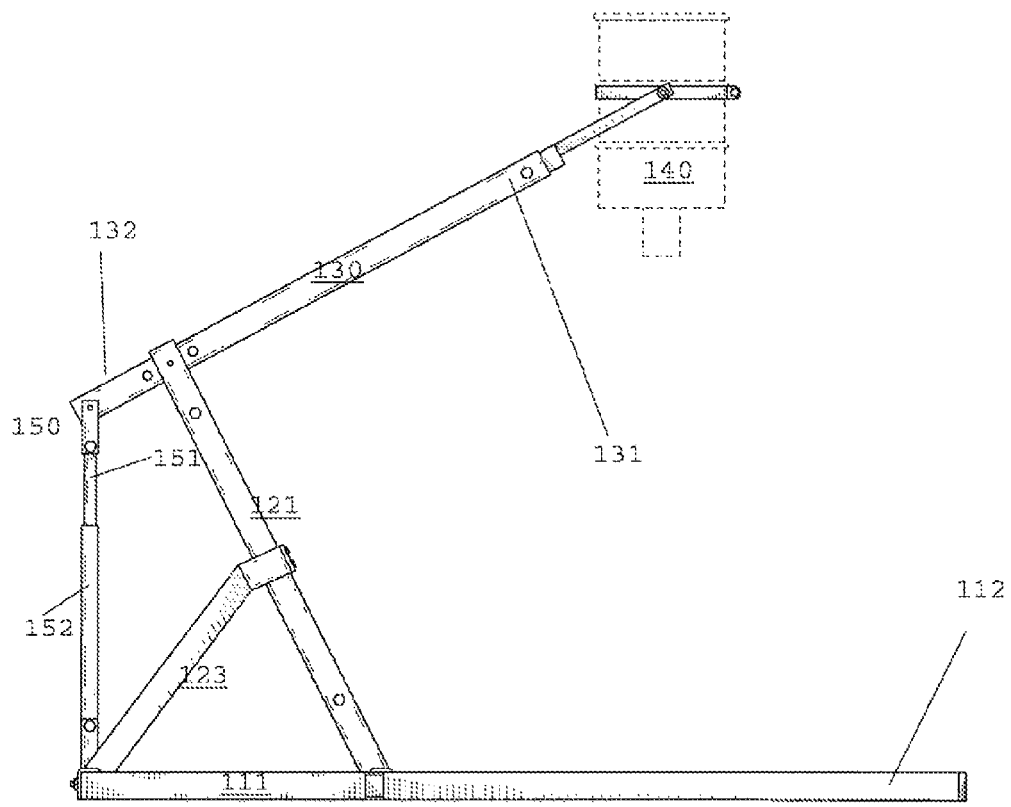

Referring to FIGS. 1 and 8, the disclosed game feeder 100 features the barrel 140 at the first end 131 of the lifting arm 130, wherein the barrel 140 may be raised or lowered by pivoting the lifting arm 130 on a yoke 120 via pulling or pushing the second end 131 thereof with the operating jack 150. In a preferable embodiment, said pulling or pushing of the second end 132 of the lifting arm 130 may be accomplished by extending the upper piston 151 of the operating jack 150 by cranking an output shaft thereof with an electric drill. Practically, an operator of the game feeder 100 may suitably lower the barrel 140, provide feed to the receptacle 141 of the barrel 140, raise the barrel 140, and activate the distributor 152 to spread the feed to the ground area near the game feeder 100.

This specification and the appended figures illustrate only typical embodiments or principles disclosed in this application, and therefore, are not to be considered limiting of the scope of this disclosure, for the invention may admit to other equally effective embodiments that will be appreciated by those reasonably skilled in the relevant arts. Any invention disclosed by this specification is defined by the claims.

I claim:

1. A game feeder comprising:
   A. a base defined by
      (a) a rectangular frame with a front, a rear, a rear right corner, rear left corner, forward right corner, and a forward left corner,
      (b) a first stabilizing leg that extends from the right front corner of the frame in a forward and rightward direction along a first plane relative to the rectangular frame, and
      (c) a second stabilizing leg that extends from the left front corner of the frame in a forward and leftward direction along the first plane relative to the rectangular frame;
   B. a yoke defined by
      (a) backwardly angled uprights, each upright secured to the front of the frame of the base between the first and second stabilizing legs,
      (b) a first back support leg extending to the uprights from the rear left corner of the frame and
      (c) a second back support leg extending to the uprights from the rear right corner of the frame;
   C. a lifting arm with a front end and a back end, wherein the lifting arm is pivotally coupled to the yoke between the uprights at a location between the front and back ends;
   D. a barrel that is pivotally connected to the front end of the lifting arm;
   E. a screw jack defined by a longitudinal axis with
      (a) an upper piston connected to the back end of the lifting arm,
      (b) a. lower piston communicating with the upper piston and attached to the rear of the frame of the base,
      the longitudinal axis of the screw jack being perpendicular to the first plane;
   and,
   F. a distributor for spreading feed placed in the barrel;
   wherein extension and retraction of the upper piston directly correlates to the elevation of the barrel; and
   wherein the barrel is located at about the midsegment of the first and second stabilizing legs.

2. The game feeder of claim 1 wherein said frame is a rectangle with dimensions that are three feet by four feet.

3. The game feeder of claim 1 wherein said first and second stabilizing legs are eight feet in length.

4. The game feeder of claim 1 wherein said screw jack is six feet and two inches high when the upper piston is fully extended.

5. The game feeder of claim 1 wherein said screw jack is configured to raise the barrel when fully retracted.

6. The game feeder of claim 1 wherein the screw jack is configured to lower the barrel when fully extended.

7. The game feeder of claim 1 wherein the longitudinal axis of the screw jack remains perpendicular to the first plane as the upper piston is retracted and extended.

8. A method of supplying a feeder with feed comprising the steps of
ensuring that the feeder comprises
A. a base defined by
(a) a rectangular frame with a front. a rear, a rear right corner, rear left corner, forward right corner, and a forward left corner,
(b) a first stabilizing leg that extends from the right front corner of the frame in a forward and rightward direction along a first plane relative to the rectangular frame, and
(c) a second stabilizing leg that extends from the left front corner of the frame in a forward and leftward direction along the first plane relative to the rectangular frame,
B. a yoke defined by
(a) backwardly angled uprights, each upright secured to the front of the frame of the base between the first and second stabilizing legs,
(b) a first back support leg extending to the uprights from the rear left corner of the frame and,
(c) a second back support leg extending to the uprights from the rear right corner of the frame,
C. a lifting arm with a front end and a back end, wherein the lifting arm is pivotally coupled to the yoke between the uprights at a location between the front and back ends.
D. a barrel that is pivotally connected to the front end of the lifting arm,
E. a screw jack defined by a longitudinal axis with
(a) an upper piston connected to the back end of the lifting arm,
(b) a lower piston communicating with the upper piston and attached to the rear of the frame of the base, the longitudinal axis of the screw jack being perpendicular to the first plane;
F. a distributor for spreading feed placed in the barrel;
wherein extension and retraction of the upper piston directly correlates to the elevation of the barrel; and
wherein the barrel is located at about the midsegment of the first and second stabilizing legs
providing feed to a feed receptacle of the barrel; and,
pivoting the lifting arm via contraction of the screw jack.

9. The method of claim 8 further comprising the steps of:
approaching the barrel while said barrel is raised by the screw jack; and
expanding the screw jack to lower the barrel.

10. The method of claim 9 further comprising the steps of:
observing the amount of feed in the feed receptacle of the barrel.

11. The method of claim 10 wherein the lever is a lifting arm and the fulcrum is a yoke that is stabilized by a square base.

12. The method of claim 8 further comprising of the steps of retracting the upper piston to accomplish pivoting of the lifting arm, wherein the back end of the lifting arm moves downward.

13. The method of claim 12 wherein the longitudinal axis of the screw jack remains perpendicular to the first plane as the upper piston is retracted.

14. The method of claim 8 comprising of the steps of extending the upper piston to accomplish pivoting of the lifting arm, wherein the back end of the lifting arm moves upward.

15. The method of claim 14 wherein the longitudinal axis of the screw jack remains perpendicular to the first plane as the upper piston is extended.

16. The method of claim 8 wherein the longitudinal axis of the screw jack remains perpendicular to the first plane as the upper piston is retracted and extended.

17. The method of claim 8 wherein said screw jack is configured to raise the barrel when fully retracted.

18. A game feeder comprising:
a stabilizing base defined by
(a) a rectangular frame with a front, a rear, a rear right corner, rear left corner, forward right corner, and a forward left corner,
(b) a first stabilizing leg that extends from the right front corner of the frame in a forward and rightward direction in a first plane relative to the rectangular frame, and
(c) a second stabilizing leg that extends from the left front corner of the frame in a forward and leftward direction in the first plane relative to the rectangular frame;
a lever on a fulcrum, the lever being pivotally attached to spaced apart portions of the fulcrum, the fulcrum being attached to the front and the rear corners of the frame: and,
an operating jack positioned at the rear of the frame for pivoting the lever on said fulcrum, the operating jack having a lower piston and an upper piston, the lower piston being operationally configured to maintain movement of the upper piston linearly along a plane perpendicular to the first plane.

* * * * *